US012149888B2

(12) United States Patent
Scheleski et al.

(10) Patent No.: US 12,149,888 B2
(45) Date of Patent: Nov. 19, 2024

(54) BALANCED ARMATURE RECEIVER AND YOKE THEREFOR

(71) Applicant: Knowles Electronics, LLC, Itasca, IL (US)

(72) Inventors: Richard Scheleski, Naperville, IL (US); Yahui Zhang, Schaumburg, IL (US)

(73) Assignee: Knowles Electronics, LLC, Itasca, IL (US)

( * ) Notice: Subject to any disclaimer, the term of this patent is extended or adjusted under 35 U.S.C. 154(b) by 308 days.

(21) Appl. No.: 17/902,791

(22) Filed: Sep. 2, 2022

(65) Prior Publication Data

US 2024/0080627 A1 Mar. 7, 2024

(51) Int. Cl.

*H04R 11/02* (2006.01)
*H04R 1/02* (2006.01)
*H04R 7/12* (2006.01)

(52) U.S. Cl.

CPC ............. *H04R 11/02* (2013.01); *H04R 1/025* (2013.01); *H04R 7/12* (2013.01)

(58) Field of Classification Search

CPC .......... H04R 11/02; H04R 1/025; H04R 7/12; H04R 11/06; H04R 11/04; H01F 7/081; H01F 7/128; H01F 2007/086

See application file for complete search history.

(56) References Cited

U.S. PATENT DOCUMENTS

| | | | | |
|---|---|---|---|---|
| 7,362,878 B2 | 4/2008 | Miller et al. | | |
| 9,992,579 B2 | 6/2018 | Albahri et al. | | |
| 12,047,740 B2 * | 7/2024 | Zhang | ...................... | H04R 7/12 |
| 2020/0154212 A1 * | 5/2020 | Albahri | .................. | H04R 11/04 |

FOREIGN PATENT DOCUMENTS

| | | | | |
|---|---|---|---|---|
| CN | 203872027 U | 10/2014 | | |
| CN | 204118999 U | 1/2015 | | |
| CN | 204119001 U | 1/2015 | | |
| CN | 104754482 A | 7/2015 | | |
| CN | 104754483 A | 7/2015 | | |
| CN | 205595998 U | 9/2016 | | |
| CN | 205596265 U | 9/2016 | | |
| WO | WO-2015057519 A1 * | 4/2015 | ............. | H04R 11/02 |

* cited by examiner

*Primary Examiner* — Angelica M McKinney
(74) *Attorney, Agent, or Firm* — Hickman Becker Bingham Ledesma LLP; Matthew C. Loppnow

(57) ABSTRACT

A balanced armature receiver including a motor with a yoke for retaining magnets and fastening to an armature are disclosed. The yoke includes a close-ended wall structure defining a passage through which an armature is extendable. The close-ended wall structure includes a plurality of wall portions interconnecting a plurality of folded corner portions, wherein a thickness of the plurality of wall portions less than a thickness of the plurality of folded corner portions.

17 Claims, 3 Drawing Sheets

BALANCED ARMATURE RECEIVER AND YOKE THEREFOR

FIELD OF THE DISCLOSURE

The present disclosure relates generally to balanced armature receivers and more particularly to improved yokes for balanced armature receivers and motors, and balanced armature receivers comprising such yokes and motors.

BACKGROUND

Balanced armature receivers (also referred to herein as "receivers") capable of producing an acoustic output signal in response to an electrical audio signal generally comprise a diaphragm separating an interior of a case or housing into a back volume and a front volume coupled to a sound port. A motor disposed in the back volume comprises a coil disposed about an armature having a free end-portion balanced between permanent magnets retained by a yoke. The free end-portion of the armature is coupled to a movable portion of the diaphragm by a drive rod or other link, wherein a magnetic field induced by the electrical signal applied to the coil moves the armature and diaphragm. Deflection of the diaphragm emits sound from the sound port. Such receivers are commonly used in hearing aids, wired and wireless earphones, True Wireless Stereo (TWS) devices, among other hearing devices. In these and other applications receiver efficiency and performance are paramount considerations. Yokes formed by folding a stamped-strip of magnetic-flux-carrying sheet material (also referred to herein as "stamped-folded-yokes") are less costly than extruded yokes, but these and other yokes tend to have relatively poor magnetic performance due to magnetic saturation. Thus there is an ongoing need for improvements in receivers and components thereof.

BRIEF DESCRIPTION OF THE DRAWINGS

The objects, features and advantages of the present disclosure will become more fully apparent upon consideration of the following detailed description and appended claims in conjunction with the accompanying drawings. The drawings depict only representative embodiments and are therefore not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described, that the order of occurrence of such actions or steps may be performed concurrently unless specified otherwise, and that the terms and expressions used herein have meanings understood by those of ordinary skill in the art except where a different meaning is attributed to them herein.

DETAILED DESCRIPTION

The disclosure relates generally to balanced armature receivers and more particularly to improved balanced armature receiver yokes, receiver motors comprising improved yokes, and receivers comprising such yokes and motors.

Figure 1:
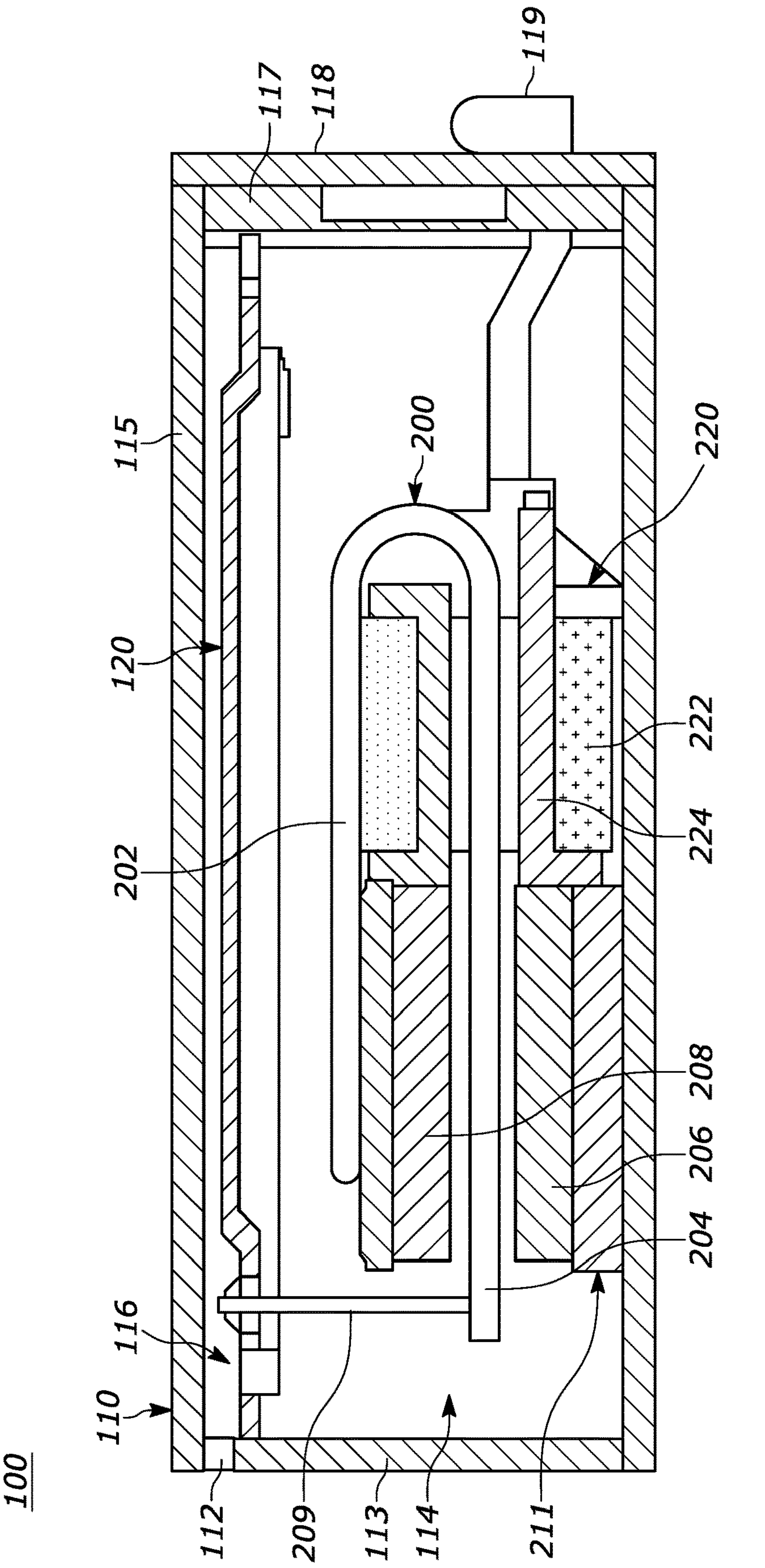
FIG. 1 is a schematic sectional view of balanced armature receiver having a yoke with improved magnetic performance.

Balanced armature receivers generally comprise a diaphragm disposed within a housing and separating an interior thereof into a back volume and a front volume acoustically coupled to a sound port. In FIG. 1, the receiver 100 comprises a housing 110, and a diaphragm 120 separating an interior of the housing into a back volume 114 and a front volume 116 connected to a sound port 112 located on an end wall 113 of the housing. In other implementations, the sound port can be located on a housing wall portion 115 parallel to the diaphragm or on some other wall portion defining the front volume.

The housing can comprise top and bottom cups fastened together upon assembly of the diaphragm and other components described herein within one or both cups. Alternatively, the housing can comprise a single cup with a cover plate. Other housings can comprise a closed sidewall portion having open top and bottom portions covered by discrete top and bottom plates, respectively.

The receiver also comprises an electromagnetic motor disposed in the housing for actuating the diaphragm. The motor is most often located in the back volume, but the motor can also be located in the front volume. The motor generally comprises an armature (also referred to herein as a "reed") having a first portion fastened to a yoke and a second portion movably located between magnets retained within a passage of the yoke. The second portion of the armature is connected to the diaphragm by a drive rod, ribbon or other link. Thus configured, movement of the second portion of the armature moves the diaphragm as described further herein. The armature can be configured as a U-reed as shown in the drawings and described further herein. Alternatively, the armature can be configured as an E-reed, or an M-reed or some other known or future reed configuration.

The motor also comprises an electrical coil assembly electromagnetically coupled to the armature. The coil assembly is most often wound about a portion of the armature, but in other implementations the coil assembly can be electromagnetically coupled to the armature without being wound about the armature. The coil assembly minimally comprises an insulated wire bound in a form for electromagnetic coupling to or with the armature. In some implementations, the insulated wire is wound about a bobbin having a passage through which the armature extends. Alternatively, an adhesive like epoxy or glue can bind the insulated wire in a coil form having a passage through which the armature extends. Ends of the coil wire are electrically coupled, either directly or by heavier conductive leads, to corresponding contacts at an interface (e.g., a terminal board) located on an exterior of the receiver housing. Application of an electrical audio signal to the coil assembly induces a magnetic field in the armature that responsively vibrates between the magnets retained by the yoke.

In FIG. 1, the motor comprises a U-shaped armature 200 having a first portion 202 connected to a yoke 211 and a second portion 204 movably disposed between magnets 206, 208 retained in spaced apart relation by the yoke. The yoke generally comprises a magnetic-flux-carrying material. An electrical coil assembly 220 comprises an insulated wire 222 wound about a bobbin 224 having an armature passage aligned with the space between the magnets. The armature portion 204 extends through the passage of the bobbin, or through the coil in embodiments without a bobbin, and into the space between the magnets. A distal portion of the armature extending through the space between the magnets is connected to a movable portion (known as a paddle) of the diaphragm by a drive rod, ribbon or other link 209. Alternatively, the drive rod can be connected to a more central portion of the armature and paddle and extend through a space between the coil and yoke and through an opening in the armature.

In FIG. 1, wires of the coil assembly are connected to corresponding electrical contacts (only contact 119 is shown in FIG. 1) on a terminal board 118 located on an end wall 117 of the housing. In other embodiments, the terminal board can be located on some other wall portion of the housing. An electrical audio signal applied to the electrical contacts causes the armature to vibrate between the magnets and actuate the diaphragm. The vibrating diaphragm emits sound from the sound port 112 via the front volume 116 of the receiver.

The yoke generally comprises a magnetic-flux-carrying close-ended wall structure defining a passage through which a free-end portion of the armature is movably located between magnets retained in spaced apart relation within the passage. The close-ended wall structure comprises a plurality of wall portions extending between and interconnecting a plurality of folded corner portions. The plurality of wall portions can comprises four or more wall portions extending between folded corner portions and each folded corner portion is connected to two wall portions.

Figure 2:
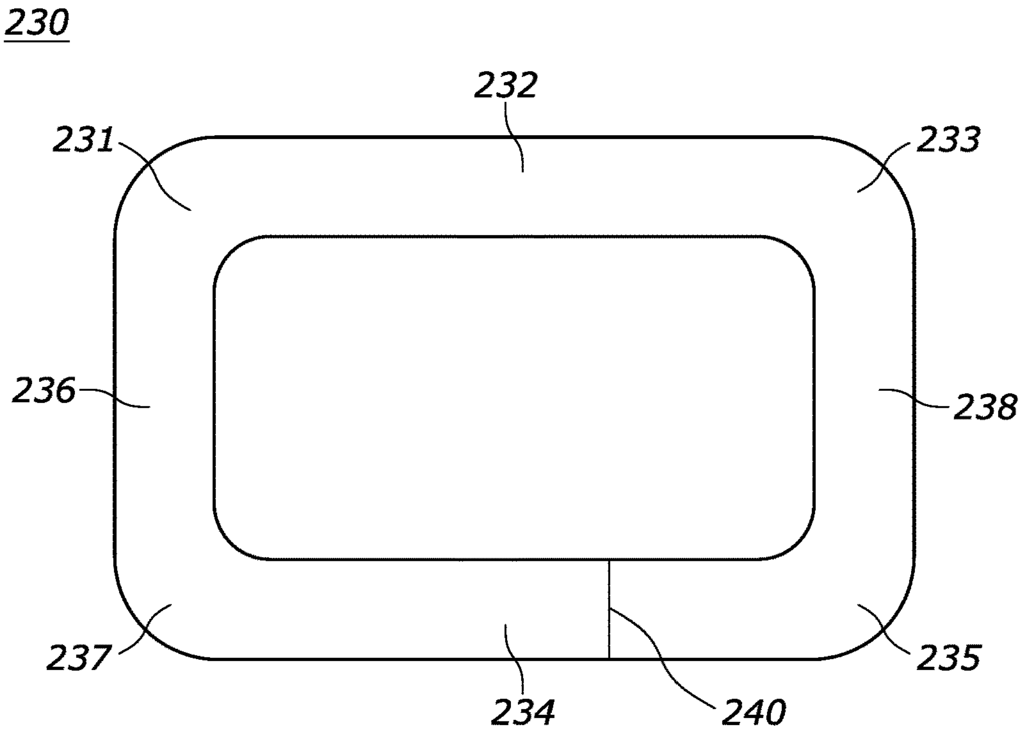
FIG. 2 is an end view of a stamped and folded yoke.

In FIG. 2, the close-ended wall structure 230 comprises first and second wall portions 232, 234 (also referred to herein as the "magnet-retaining wall portions") arranged in parallel for retaining corresponding magnets in spaced apart relation within the passage of the yoke, as shown in FIG. 1. The first wall portion 232 includes a first magnet-mounting surface spaced apart from and parallel to a second magnet-mounting surface of the second wall portion 234. The magnets can be fixed to the magnet-mounting surfaces within the passage of the yoke by an adhesive, retention structure or other fastening mechanism. The first magnet-retaining wall portion 232 extends between and interconnects first and second folded corner portions 231, 233. The second magnet-retaining wall portion 234 extends between and interconnects third and fourth folded corner portions 235, 237. A first sidewall portion 236 extends between and interconnects the first and fourth folded corner portions 231, 237. A second sidewall portion 238 extends between and interconnects the second and third folded corner portions 233, 235.

A thickness of a radial dimension of the plurality of folded corner portions is not less than a thicknesses of the plurality of wall portions. Such a yoke has improved magnetic performance and contributes to improved efficiency and performance of the receiver. A thickness of the wall portions of the yoke is measured between, and perpendicular, to an inner surface of the wall portion defining the passage and an outer surface, opposite the inner surface, of the wall portion. The thicknesses of the plurality of folded corner portions of the yoke is measured along a radial dimension of the plurality of folded corner portions. In one implementation, the thicknesses of the folded corner portions are uniform with the thicknesses of the wall portions. In another implementation, the thicknesses of the plurality of corner portions is greater than the thicknesses of the plurality of wall portions. In a more particular implementation, the thicknesses of the plurality of wall portions is at least 20% less than the thicknesses of the plurality of folded corner portions. Representative examples are described herein.

The close-ended wall structure can be fabricated from one or more magnetic-flux-carrying strips stamped from sheet stock (also referred to herein as a "stamped-strip"). The one or more stamped-strips are subsequently folded and fastened at one or more joints. In FIG. 2, the magnetic-flux-carrying close-ended wall structure comprises a single stamped-strip that is subsequently folded and fastened at a single joint 240. The joint can be located on any one of the sidewalls. In other implementations, the close-ended wall structure comprises two folded strips stamped from sheet material. The two stamped-strips are subsequently folded and fastened at two joints. In some two stamped-strip implementations, each sidewall 236, 238 can comprise two sidewall portions fastened by a corresponding joint. Alternatively, the two joints can be located on the first and second magnet-retaining wall portions 232, 234.

Figure 3:
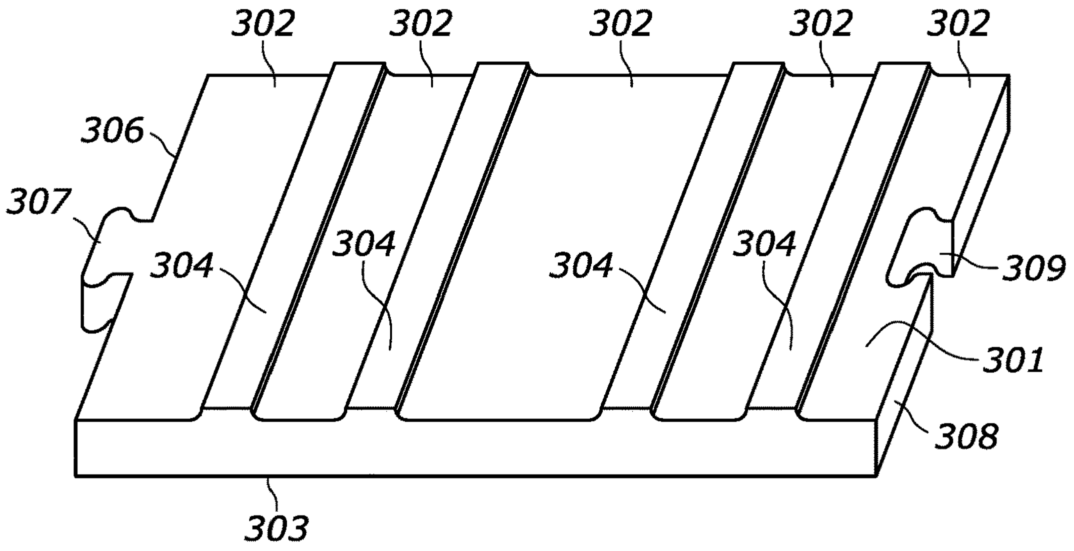
FIG. 3 is a perspective view of stamped-strip portion prior to folding to form a stamped and folded yoke.

FIG. 3 is illustrates a stamped-strip 300 prior to folding to form a close-ended wall structure. The stamped-strip comprises strip portions 302 corresponding to the sidewalls of the yoke and strip portions 304 corresponding to the folded corner portions of the yoke. The strip portions 302 have a thickness measured between opposite surfaces 301 and 303 of the stamped-strip 300 and correspond to the thickness of the sidewalls of the yoke. The strip portions 304 have a thickness greater than a thickness of the strip portions 302. The strip portions 304 correspond to the folded corner portions of the yoke. The thicknesses of the folded corner portions can be less than the thicknesses of the strip portions 304 prior to folding due to deformation of the strip portions 304 during the folding operation. The folded corner portions nevertheless have thicknesses not less than thicknesses of the sidewall portions of the close-ended wall structure.

The reduced thickness portions 302 of the stamped-strip 300 can be cost effectively formed by a coining operation, wherein the coining operation forms coined wall portions of the closed-ended wall structure constitute the yoke. Alternatively, the portions of the stamped-strip having reduced thickness can be formed in a milling, grinding, chemical etching or some other material removal operation.

The one or more joints of the closed-ended wall structure can be configured as one or more butt-joints. The joints can also comprise complementary engagement structures formed on the end portions of the stamped-strip. Examples of such engagement structure include dovetail joints among other interlocking or non-interlocking structures. In FIG. 3, an end surface 306 of the stamped-strip 300 comprises a tab 307 that engages and interlocks with a complementary recess 309 on an opposite end surface 308. In close-ended wall structures formed from two stamped-strips joined on the sidewalls that do not retain the magnets, the joints can be butt-joints or lap joints. These and other joints can also be welded or stamped to increase robustness. A welded joint may require annealing to compensate for any reduction in magnetic performance caused by the welding operation. The joint can also include a conductive adhesive alone or in combination with the engagement structure.

Figure 4:
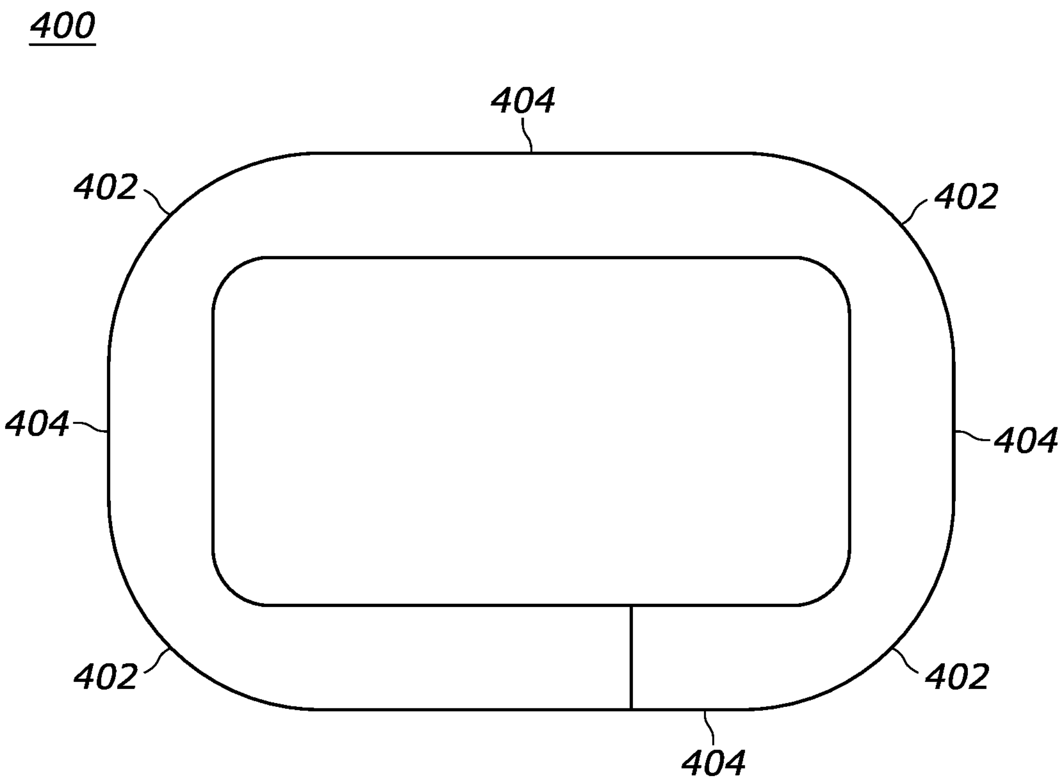
FIG. 4 Prior Art
FIG. 4 is an end view of a prior art stamped and folded yoke.

FIG. 4 illustrates a prior art yoke 400 comprising folded corner portions 402 having a thickness less than a thickness of sidewalls 404. The reduced thicknesses of the corner portions 402 can result from deformation during the folding operation of a stamped-strip having uniform thickness. The reduced thicknesses of the folded corner portions can also result from deformation during the folding operation of a stamped-strip having strip portions with reduced thickness corresponding to the folded corner portions, wherein the strip portions having reduced thickness facilitate folding the stamped-strip. Magnetic flux produced by the electrical coil and magnets will saturate the folded corner portions having reduced thickness before other portions of the yoke having thicker sidewalls. Saturation adversely affects the efficiency and performance of the receiver, causes more flux leakage into air that can interfere with other components, like a tele-coil of a host system. Yokes formed by other processes may also be susceptible to degraded performance resulting from saturation.

In one embodiment, a balanced armature receiver yoke including an armature passage defined by a close-ended wall structure comprising plurality of folded corner portions and a corresponding wall portions extending between and interconnecting neighboring folded corner portions. The close-ended wall structure comprises a single folded stamped-strip of sheet of a magnetic-flux-carrying material having end portions mated at a joint.

The yoke can be part of a balanced armature receiver motor further comprising a first magnet located in an armature passage defined by the close-ended wall structure and fastened to a first wall portion, and a second magnet located in the armature passage and fastened to a second wall portion opposite the first wall portion. The armature comprises a first portion fastened to the yoke and a second portion movably located in the armature passage between the first and second magnets. An electrical coil assembly is electromagnetically coupled to the armature.

The motor can be part of a balanced armature receiver further comprising a diaphragm disposed in a housing. The diaphragm separates an interior of the housing into a back volume and a front volume acoustically coupled to a sound port, and a link connecting the armature to the diaphragm.

A thickness of a radial dimension of the plurality of folded corner portions not less than a thickness of the plurality of wall portions. The thickness of the plurality of corner portions can be greater than the thickness of the plurality of wall portions. In some embodiment, the thickness of the wall portions is at least twenty percent (20%) less than a thickness of the plurality of folded corner portions. The thickness of the plurality of wall portions is between an inner surface of the wall portion defining the passage and an outer surface, opposite the inner surface, of the wall portion, and the thickness of the plurality of folded corner portions is along a radial dimension of the plurality of folded corner portions.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. A balanced armature receiver yoke comprising:

a close-ended wall structure defining an armature passage through which a free-end portion of an armature is movably located between magnets retained in spaced apart relation within the passage when another portion of the armature is fastened to the close-ended wall structure, the close-ended wall structure comprising:

a plurality of wall portions;

a plurality of folded corner portions, a corresponding one of the plurality wall portions extending between and interconnecting neighboring folded corner portions;

a thickness of a radial dimension of the plurality of folded corner portions not less than a thickness of the plurality of wall portions, wherein the close-ended wall structure is a magnetic-flux-carrying material, wherein each of the plurality of wall portions are coined wall portions.

2. The balanced armature receiver yoke of claim 1, wherein the thickness of the plurality of corner portions is greater than the thickness of the plurality of wall portions.

3. The balanced armature receiver yoke of claim 2, wherein the thickness of the plurality of wall portions is between an inner surface of the wall portion defining the passage and an outer surface, opposite the inner surface, of the wall portion, and the thickness of the plurality of folded corner portions is along a radial dimension of the plurality of folded corner portions.

4. The balanced armature receiver yoke of claim 2, a first wall portion of the plurality of wall portions including a first magnet-mounting surface, and a second wall portion of the plurality of wall portions including a second magnet-mounting surface, wherein the first wall portion is spaced apart from and parallel to the second wall portion.

5. The balanced armature receiver yoke of claim 3, the plurality of wall portions comprising at least four wall portions and the plurality of folded corner portions comprises at least four folded corner portions, each wall portion connected to and extending between two folded corner portions and each folded corner portion connected to two wall portions.

6. The balanced armature receiver yoke of claim 3, the close-ended wall structure comprising a single folded stamped-strip of sheet material having end portions mated at a joint.

7. The balanced armature receiver yoke of claim 1, wherein the thickness of the wall portions is at least 20% less than a thickness of the plurality of folded corner portions.

8. The balanced armature receiver yoke of claim 1 further comprising:

first and second magnets retained in spaced apart relation within the passage; and an armature having a first end portion fastened to the yoke and a second end portion movably disposed between the first and second magnets.

9. A balanced armature receiver motor comprising:

a magnetic-flux-carrying yoke comprising a plurality of folded corner portions interconnected by a plurality of wall portions defining a close-ended structure having an armature passage, a thickness along a radial dimension of the plurality of folded corner portions not less than a thickness of the plurality of wall portions;

a first magnet located in the armature passage and fastened to a first wall portion of the plurality of wall portions, and a second magnet located in the armature passage and fastened to a second wall portion of the plurality of wall portions opposite the first wall portion of the plurality of wall portions;

an armature having a first portion fastened to the yoke, the armature having a second portion movably located in the armature passage between the first and second magnets; and an electrical coil assembly electromagnetically coupled to the armature, wherein each of the plurality of wall portions are coined wall portions.

10. The balanced armature receiver motor of claim 9, wherein the thickness of the plurality of corner portions is greater than the thickness of the plurality of wall portions.

11. The balanced armature receiver motor of claim 10, the plurality of wall portions comprising at least four wall portions and the plurality of folded corner portions comprising at least four folded corner portions, each wall portion connected to and extending between two folded corner portions and each folded corner portion connected to two wall portions.

12. The balanced armature receiver motor of claim 10, the yoke comprising a folded stamped-strip of sheet material having end portions mated at a joint.

13. The balanced armature receiver motor of claim 9, wherein the thickness of the wall portions is at least 20% less than a thickness of the radial dimension of the plurality of folded corner portions.

14. A balanced armature receiver comprising:

a housing having a sound port;

a diaphragm disposed in the housing and separating the housing into a back volume and a front volume acoustically coupled to the sound port;

a motor disposed in the housing and comprising:

a magnetic-flux-carrying yoke comprising a plurality of folded corner portions interconnected by a plurality of wall portions defining a close-ended structure having an armature passage, a thickness of the plurality of wall portions less than a thickness of the plurality of folded corner portions;

a first magnet located in the armature passage and fastened to a first wall portion of the close-ended structure, and a second magnet located in the armature passage and fastened to a second wall portion, opposite the first wall portion, of the close-ended structure;

an armature having a first portion fastened to the yoke, the armature having a second portion movably located in the armature passage between the first and second magnets;

an electrical coil assembly electromagnetically coupled to the armature; and a link connecting the armature to the diaphragm the close-ended structure comprising a folded stamped-strip having end portions mated at a joint, and wherein each of the plurality of wall portions are coined wall portions.

15. The balanced armature receiver of claim 14, wherein the thickness of the plurality of corner portions is uniform.

16. The balanced armature receiver of claim 14, the plurality of wall portions comprising at least four wall portions and the plurality of folded corner portions comprises at least four folded corner portions, each wall portion connected to and extending between two folded corner portions and each folded corner portion connected to two wall portions.

17. The balanced armature receiver of claim 14, wherein the thickness of the wall portions is at least 20% less than a thickness of the radial dimension of the plurality of folded corner portions.

* * * * *